United States Patent Office
2,879,137
Patented Mar. 24, 1959

2,879,137
NICKEL AND COBALT RECOVERY FROM AMMONIACAL SOLUTIONS

Conrad B. Bare, Lebanon, and Robert L. Clauser, Schaefferstown, Pa., assignors to Bethlehem Steel Company, a corporation of Pennsylvania No Drawing. Application October 12, 1956
Serial No. 615,710

10 Claims. (Cl. 23—183)

This application is a continuation-in-part of application Serial No. 358,908, filed June 1, 1953, now abandoned.

This invention relates to a process of separating nickel from cobalt from solutions containing appreciable concentrations of each metal, and more particularly to the selective precipitation of nickel, substantially free of cobalt, from ammoniacal solutions obtained from treating nickeliferous lateritic ores.

In previous practice, it is known that a degree of separation of nickel from cobalt has been obtained by the fractional distillation of ammonia and carbon dioxide from ammoniacal ammonium carbonate solutions, in which part of the metal content is precipitated at an improved nickel to cobalt ratio.

We have found that when an oxidized ammoniacal ammonium carbonate solution, obtained from leaching an ore and containing nickel and cobalt, wherein the cobalt is present in the cobaltic state, is treated with an alkali metal or alkaline earth metal hydroxide under controlled temperature conditions, nickel can be precipitated substantially free of cobalt. Furthermore, the cobalt remaining in solution, after removal of the nickel therefrom, can be recovered from solution by well-known means and in a state comparatively free of nickel.

One example of effecting the separation of nickel from cobalt, in accordance with our invention, is given below:

EXAMPLE I

A lateritic ore containing nickel and cobalt, after having been given a reducing roast, was subjected to the leaching action of an ammoniacal ammonium carbonate solution in an oxidizing environment to solubilize the nickel and cobalt. The solution, containing the solubilized nickel and cobalt, and which was recovered from the ore by counter-current decantation, was aerated to insure the presence of cobalt largely, if not entirely, in the cobaltic state. The solution resulting from the leaching operation had the following analysis:

|     | G./l. |
| --- | --- |
| Ni  | 8.4 |
| Co  | 1.1 |
| $NH_3$ | 125 |
| $CO_2$ | 110 |

To 7.5 liters of this solution was added 1710 grams of sodium hydroxide in the form of a 10% solution. The reacting mixture was maintained at a temperature of approximately 100° F. A light green nickel hydroxide precipitate formed and this precipitate was separated from the solution by filtration and thoroughly washed. The precipitate contained 99% of the nickel and only 3.6% of the cobalt present in the original solution. The remaining solution was heated to precipitate the cobalt. From the results it will be seen that substantially all of the nickel was precipitated at a nickel to cobalt ratio of 210 to 1 from a solution containing a nickel to cobalt ratio of less than 8 to 1.

A modification of the process described in the foregoing example is shown in the following:

EXAMPLE II

The pregnant leach liquor used in Example I was steam distilled to drive off a large fraction of excess ammonia and carbon dioxide. In this instance the distillation was discontinued at the point where a precipitate just begins to form. The solution was cooled, filtered to remove any iron and manganese precipitate, and aerated to oxidize the cobalt. After this treatment, the solution analyzed as follows:

|     | G./l. |
| --- | --- |
| Ni  | 7.0 |
| Co  | 0.89 |
| $NH_3$ | 20.6 |
| $CO_2$ | 13.6 |

To 9 liters of this solution was added 228 grams of sodium hydroxide in the form of a 10% solution. The temperature of the reacting mixture was maintained at approximately 100° F. A nickel-containing precipitate was formed, the precipitate being separated from solution by filtration and washed. The precipitate contained 99.8% of the nickel but only 4.5% of the cobalt originally present in the partially distilled solution. Thus, substantially all of the nickel was precipitated at a ratio of nickel to cobalt of 175 to 1.

As another example of our process, a run made on a pregnant leach liquor, produced on a small pilot plant scale, is described in the example below:

EXAMPLE III

The leach liquor was produced by continuously leaching a specially treated Cuban laterite ore with ammonia-ammonium carbonate solution. The pregnant liquor was steam distilled to drive off a large fraction of the excess ammonia and carbon dioxide. The partially distilled solution was filtered, cooled and aerated for several hours to oxidize the cobalt. To 365 gallons of this partially distilled and oxidized solution, which analyzed as follows:

|     | G./l. |
| --- | --- |
| Ni  | 9.1 |
| Co  | 1.0 |
| $NH_3$ | 20.0 |
| $CO_2$ | 14.8 | was added 103 pounds of sodium hydroxide as a 10% solution. The reacting mixture was maintained at 100° F. The precipitation of the nickel was carried out continuously at a solution rate of 4.2 gal./min. After separating the precipitate from the solution by filtration and thoroughly washing it with water, the precipitate analysis indicated a nickel to cobalt ratio of 94 to 1. The precipitate contained 99.9% of the nickel but only 9.7% of the cobalt originally present in the partially stripped solution.

Impurities such as iron or manganese, if present in solution, precipitate when ammonia and carbon dioxide are driven off from solution to about the point where nickel begins to precipitate. Precipitates of these impurities carry with them small amounts of nickel and cobalt. In practice we prefer to remove such precipitated impurities by filtration before the addition of sodium hydroxide, thus preventing the contamination of the nickel precipitate with iron, manganese and cobalt. When most of the ammonia and carbon dioxide are driven off from solution, as by steam distilling in Examples II and III, considerably less alkali is required to precipitate the nickel.

In Examples II and III, the ammonical ammonium carbonate solution of nickel and cobalt was steam distilled to the point where the nickel just began to precipitate, cooled, filtered, and sodium hydroxide added. While the process can be effectively carried out by watching for the first appearance of nickel precipitate, we have found it advantageous, in practice, to stop the boiling when the ammonia concentration of the solution reaches a value approximating the ammonia concentration at the time of incipient nickel precipitation. Each ammoniacal ammonium carbonate solution of nickel and cobalt has a particular ammonia concentration at the time of incipient precipitation of nickel, i. e., the point at which nickel just begins to precipitate. This is not a constant value, but one which varies with the concentration of nickel and cobalt in the solution. To determine the point of incipient precipitation of nickel for any particular solution to be treated, we take a small sample of the solution and steam distill until the nickel just begins to precipitate, cool the solution, and determine the approximate ammonia concentration by titrating with 1 N HCl, using methyl orange indicator. This titration gives only an approximate indication of the ammonia concentration, as metal values in the solution will react with hydrochloric acid before the end point is reached. However, we have found that this titration has proved satisfactory as a control measure. Having thus ascertained the approximate concentration of ammonia at the time of incipient precipitation of nickel, the solution, to be treated by our process, is steam distilled to remove ammonia and carbon dioxide until the ammonia concentration is found to approximate that previously found by test to correspond to the concentration at the time of incipient precipitation of nickel. When this concentration is reached, the solution is cooled to the desired degree, filtered, and sodium hydroxide added.

It is to be noted that the distillation is terminated when the ammonia concentration is approximately that previously determined to correspond to that of incipient precipitation of nickel. Exactness is not necessary. For example, the distillation may be terminated when the solution still contains an ammonia concentration somewhat in excess of that previously determined to be that of incipient precipitation of nickel. Likewise, the distillation may be terminated somewhat after the ammonia concentration of incipient precipitation of nickel has been reached.

The amount of sodium hydroxide to be added to precipitate the nickel, varies with different solutions. We have found that a satisfactroy amount to use is that which is slightly in excess of the stoichiometric equivalent of the carbon dioxide contained in the particular solution being treated.

When we refer herein to the ammonia concentration of the solution, or to the amount of ammonia in the solution, we mean all of the ammonia present, whether present as the hydroxide, carbonate or in any other form.

In the examples given above, the solution treated contained considerably greater quantities of nickel than of cobalt, the ratio of nickel to cobalt running between about 7 and 10. When solutions such as these are treated by the process described the cobalt content of the nickel precipitate is very low as compared with that of the nickel, and the nickel content of the cobalt precipitate is very low as compared with that of the cobalt. If the amount of cobalt relative to the amount of nickel, in a solution to be treated, is greater, or, in other words, if the nickel to cobalt ratio is less, a higher percentage of cobalt will be present in the nickel precipitate. The cobalt precipitate, however, will continue to be very low in nickel. When the solution to be treated contains such a nickel to cobalt ratio as to give a nickel precipitate having a cobalt content higher than desired, the nickel precipitate can be dissolved in an ammoniacal ammonium carbonate solution and the resulting solution subjected to the same treatment as that given to the original solution, namely, boiling to reduce the ammonia and carbon dioxide concentration of the solution to that which approximates that of incipient precipitation of nickel, cooling, and adding sodium hydroxide to precipitate the nickel. This new nickel precipitate, thus obtained, will obviously be substantially lower in cobalt content than the previous precipitate.

The importance of temperature in the application of our invention is shown by results of tests described below.

The solution used in Example I was steam distilled as in Example II and, after cooling, filtering and aerating, three equal 8.7 liter batches of solution were treated with 207 grams of sodium hydroxide as a 10% solution at three different temperatures. The results are given in the following table:

Table I

| Temp., ° F. | Nickel Precipitate, Ni/Co Ratio | Fraction of Cobalt Coprecipitated with Nickel, Percent |
| --- | --- | --- |
| 80 | 137 | 6 |
| 120 | 46 | 17 |
| 160 | 19 | 42 |

In each of the three tests indicated in this table, more than 99.5% of the nickel was precipitated. However, due to the instability of the cobaltic amine toward the alkaline agent at higher temperatures, greater amounts of cobalt were coprecipitated with the nickel, rendering the separation inadequately effective at temperatures above approximately 125° F. On the other hand, effective separations can be obtained with temperatures as low as 50° F.

In regard to the aeration of the solution prior to the precipitation of the nickel, it may be that the particular solution to be treated is sufficiently oxidized as to require no further oxidation. In general we prefer, as a precautionary measure to allow the solution to be agitated for several hours in the presence of air before precipitating the nickel. In some instances it was found to be beneficial to extend the period of aeration to from 18 to 24 hours. However, we have found that in treating solutions containing nickel and cobalt values extracted from lateritic ores, which solutions were recovered through counter-current decantation on a small pilot plant scale, a period of from three to four hours agitation in an air atmosphere is perfectly satisfactory.

It is advisable, when filtering the solution from the nickel precipitate, to do so within a reasonably short time, say within about one hour, after forming the precipitate. If the nickel precipitate is allowed to remain with the solution for long periods, for example, over night, a certain amount of cobalt will be carried down by the nickel precipitate, thus rendering a less efficient separation than can be attained when the filtration operation is performed more promptly.

Usually we employ sodium hydroxide as the nickel precipitant, but other alkali metal, or alkaline earth metal, hydroxides such as potassium, calcium and barium may be used.

A modification of our process will now be described, relating to the treatment of nickel and cobalt solutions which contain such proportions of cobalt as to give nickel precipitates having a higher cobalt content than desired.

In this modification of our process, the ammoniacal ammonium carbonate solution of nickel and cobalt to be treated is boiled to lower the ammonia and carbon dioxide concentration of the solution to the point of approximate incipient precipitation of nickel, and the solution cooled. Sodium hydroxide is added in an amount necessary to produce a precipitate of nickel having the desired low content of cobalt, the solution and precipitate are separated, and sodium hydroxide added to the solution in amount sufficient to precipitate the remainder of the nickel and some cobalt. This precipitate is separated from the solution and dissolved in an ammoniacal ammonium carbonate solution which is then subjected to the same treatment given to the original solution in the specific example of our process first given above.

We claim:

1. A process of separating nickel and cobalt which comprises treating an oxidized ammoniacal ammonium carbonate solution which contains nickel and cobalt values in solution, with an hydroxide of at least one of the group consisting of sodium, potassium, calcium and barium at a temperature of not more than 125° F. and thereby precipitating a compound of nickel, separating precipitated nickel from solution, then heating the remaining solution to drive off ammonia and thereby precipitating a compound of cobalt.

2. A process of separating nickel and cobalt which comprises the steps of heating an oxidized ammoniacal ammonium carbonate solution of nickel and cobalt compounds to drive off ammonia and carbon dioxide until the ammonia concentration of the solution is approximately that of incipient precipitation of nickel, cooling the solution below 125° F., adding an hydroxide of at least one of the group consisting of sodium, potassium, calcium and barium to the solution and thereby precipitating a compound of nickel, separating the precipitated nickel compound from solution and heating the solution to drive off ammonia and thereby precipitating a compound of cobalt.

3. A process of separating nickel and cobalt which comprises the steps of heating an oxidized ammoniacal ammonium carbonate solution of nickel and cobalt compounds to drive off ammonia and carbon dioxide until the ammonia concentration of the solution is approximately that of incipient precipitation of nickel, cooling the solution below 125° F., adding an hydroxide of at least one of the group consisting of sodium, potassium, calcium and barium to the solution and thereby precipitating substantially all of the nickel, separating the precipitated nickel compound from solution and heating the solution to drive off ammonia and thereby precipitating a compound of cobalt.

4. A process of separating nickel and cobalt which comprises the steps of heating an oxidized ammoniacal ammonium carbonate solution of nickel and cobalt compounds to drive off ammonia and carbon dioxide until the ammonia concentration of the solution is approximately that of incipient precipitation of nickel, cooling the solution below 125° F., adding sodium hydroxide to the solution and thereby precipitating a compound of nickel, separating the precipitated nickel compound from solution and heating the solution to drive off ammonia and thereby precipitating a compound of cobalt.

5. A process of separating nickel and cobalt which comprises the steps of heating an oxidized ammoniacal ammonium carbonate solution of nickel and cobalt compounds to drive off ammonia and carbon dioxide until the ammonia concentration of the solution is approximately that of incipient precipitation of nickel, cooling the solution below 125° F., adding potassium hydroxide to the solution and thereby precipitating a compound of nickel, separating the precipitated nickel compound from solution and heating the solution to drive off ammonia and thereby precipitating a compound of cobalt.

6. A process of separating nickel and cobalt which comprises the steps of heating an oxidized ammoniacal ammonium carbonate solution of nickel and cobalt compounds to drive off ammonia and carbon dioxide until the ammonia concentration of the solution is approximately that of incipient precipitation of nickel, cooling the solution below 125° F., adding calcium hydroxide to the solution and thereby precipitating a compound of nickel, separating the precipitated nickel compound from solution and heating the solution to drive off ammonia and thereby precipitating a compound of cobalt.

7. A process of separating nickel and cobalt which comprises the steps of heating an oxidized ammoniacal ammonium carbonate solution of nickel and cobalt compounds to drive off ammonia and carbon dioxide until the ammonia concentration of the solution is approximately that of incipient precipitation of nickel, cooling the solution below 125° F., adding barium hydroxide to the solution and thereby precipitating a compound of nickel, separating the precipitated nickel compound from solution and heating the solution to drive off ammonia and thereby precipitating a compound of cobalt.

8. In the separation of nickel from cobalt in a solution obtained from leaching a nickeliferous lateritic ore the process which comprises oxidizing an ammoniacal ammonium carbonate leach solution of nickel and cobalt compounds, heating the solution to drive off ammonia and carbon dioxide until the ammonia concentration of the solution is approximately that of incipient precipitation of nickel, filtering the solution, cooling the solution below 125° F., adding sodium hydroxide to the solution and thereby precipitating a compound of nickel, separating the precipitated nickel compound from solution and heating the solution to drive off ammonia and thereby precipitating a compound of cobalt.

9. A process of separating nickel and cobalt which comprises treating an ammoniacal ammonium carbonate solution, which contains nickel and cobaltic cobalt values in solution, with an hydroxide of at least one of the group consisting of sodium, potassium, calcium and barium at a temperature not in excess of 125° F. and thereby precipitating substantially all of the nickel, separating precipitated nickel from solution, then heating the remaining solution to drive off ammonia and thereby precipitating a compound of cobalt.

10. A process of separating nickel from cobalt which comprises treating an oxidized ammoniacal ammonium carbonate solution, which contains nickel and trivalent cobalt values in solution, with sodium hydroxide at a temperature of not more than 125° F. and thereby precipitating substantially all of the nickel, separating precipitated nickel from the solution, then heating the remaining solution to drive off ammonia and thereby precipitating substantially all of the cobalt.

References Cited in the file of this patent

UNITED STATES PATENTS

| 1,487,145 | Caron | Mar. 18, 1924 |
| 2,531,336 | Hills et al. | Nov. 21, 1950 |
| 2,711,956 | Schaufeberger | June 28, 1955 |
| 2,735,760 | Allen et al. | Feb. 21, 1956 |

FOREIGN PATENTS

| 492,158 | Canada | Apr. 21, 1953 |